US012803899B2

(12) United States Patent
Sinha et al.

(10) Patent No.: US 12,803,899 B2
(45) Date of Patent: Nov. 17, 2026

(54) BGP BACKUP PATH SELECTION EXCLUDING FATE SHARED PATHS

(71) Applicant: Arista Networks, Inc., Santa Clara, CA (US)

(72) Inventors: Megha Sinha, Campbell, CA (US); Qing Yang, Cupertino, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 103 days.

(21) Appl. No.: 18/897,570

(22) Filed: Sep. 26, 2024

(65) Prior Publication Data

US 2026/0089093 A1 Mar. 26, 2026

(51) Int. Cl.
*H04L 45/28* (2022.01)
*H04L 45/02* (2022.01)
*H04L 45/748* (2022.01)

(52) U.S. Cl.
CPC .............. *H04L 45/28* (2013.01); *H04L 45/04* (2013.01); *H04L 45/748* (2013.01)

(58) Field of Classification Search
CPC ........ H04L 45/28; H04L 45/04; H04L 45/748
See application file for complete search history.

(56) References Cited

U.S. PATENT DOCUMENTS

2019/0036808 A1* 1/2019 Shenoy ................... H04L 45/02
2022/0231936 A1* 7/2022 Mohanty ............. H04L 12/4641

* cited by examiner

*Primary Examiner* — El Hadji M Sall
(74) *Attorney, Agent, or Firm* — Fountainhead Law Group, PC

(57) ABSTRACT

Techniques for performing Border Gateway Protocol (BGP) backup path selection are provided. In one set of embodiments, a BGP speaker can select a best path for an Internet Protocol (IP) prefix and can determine that the best path is in a first fate shared group comprising a group of paths that are vulnerable to a common failure. The BGP speaker can then determine one or more candidate backup paths that are in a second fate shared group different from the first fate shared group (or are not in any fate shared group) and can select at least one of the one or more candidate backup paths as a backup path for the IP prefix.

20 Claims, 7 Drawing Sheets

BGP BACKUP PATH SELECTION EXCLUDING FATE SHARED PATHS

BACKGROUND

Border Gateway Protocol (BGP) is a networking protocol that enables network devices to exchange reachability information with each other in order to determine the best paths (i.e., routes) to Internet Protocol (IP) prefixes (which correspond to destination devices/networks). A network device that implements the BGP protocol is known as a BGP speaker and BGP speakers that engage in a mutual exchange of reachability information via BGP are known as peers.

BGP Prefix Independent Convergence (PIC) is a BGP control plane mechanism that is designed to reduce the convergence time of BGP in the case of a network failure. Convergence time refers to the amount of time needed for a BGP speaker to reach a consistent view of the network topology and begin rerouting traffic after a failure occurs. One technique provided by BGP PIC for achieving this goal involves precomputing one or more backup paths for an IP prefix, in addition to the IP prefix's best path. With these backup paths in place, if a failure on the best path occurs, the BGP speaker immediately switches over to using one of the backup paths for forwarding network traffic destined for that IP prefix, thereby reducing its convergence time (and thus reducing the amount of traffic loss/disruption caused by the failure).

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 4 depicts a second example network in accordance with certain embodiments of the present disclosure.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

Embodiments of the present disclosure are directed to techniques for selecting one or more backup paths for an IP prefix in a manner that excludes paths which are "fate shared" with the IP prefix's best path (to the extent possible). As explained in further detail below, a group of paths are considered fate shared with each other if they are vulnerable to, and thus can be brought offline because of, a common failure. By preventing paths that are fate shared with the IP prefix's best path from being selected as a backup path for that IP prefix, these techniques can advantageously improve the effectiveness of the BGP PIC mechanism.

1. Example Network and BGP Speaker

Figure 1:
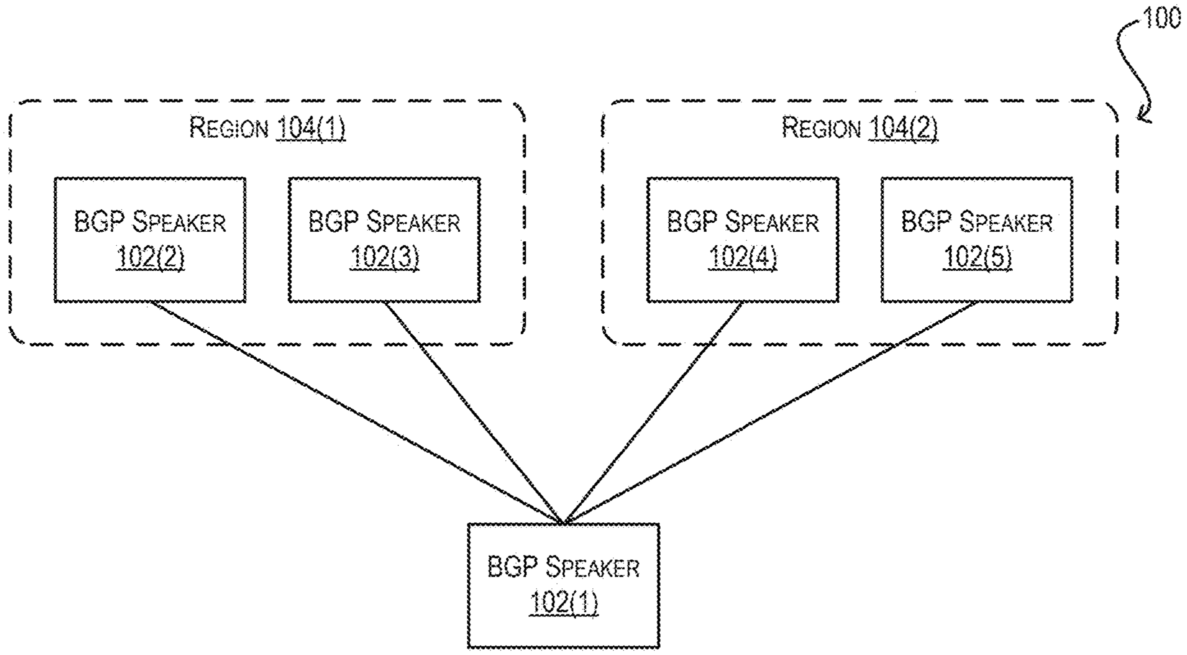
FIG. 1 depicts a first example network in accordance with certain embodiments of the present disclosure.

FIG. 1 is a simplified block diagram of an example network 100 in which the techniques of the present disclosure may be implemented. As shown, network 100 includes a BGP speaker 102(1) that is connected to four other BGP speakers 102(2), 102(3), 102(4), and 102(5) respectively. Each BGP speaker 102 is a network device (e.g., a switch or router) that runs the BGP protocol and uses BGP to exchange reachability information with other BGP speakers (peers), thereby learning paths to destination devices/networks. In this example, BGP speakers 102(2) and 102(3) are in a common geographic region 104(1) and similarly BGP speakers 102(4) and 102(5) are in a common geographic region 104(2). For example, BGP speakers 102(2) and 102(3) may reside in one physical data center and BGP speakers 102(4) and 102(5) may reside in another physical data center.

Figure 2:
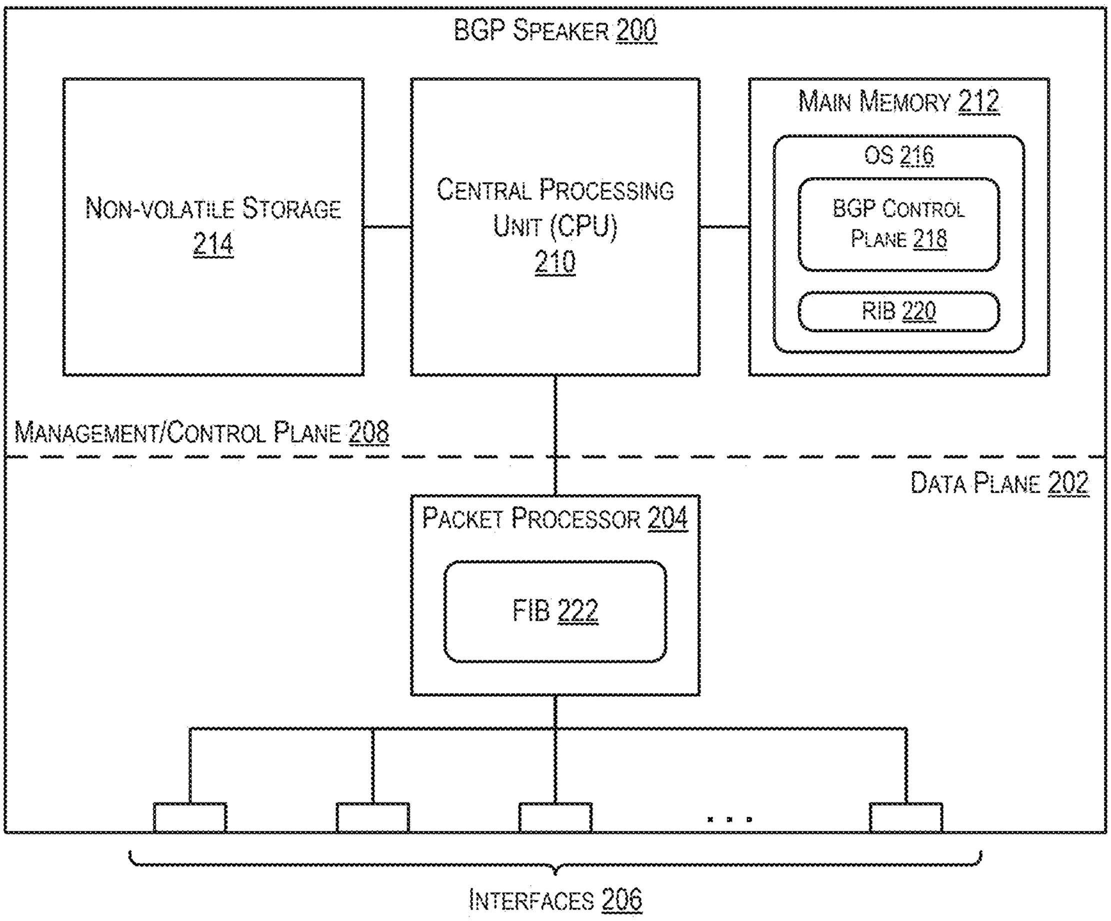
FIG. 2 depicts a first example BGP speaker in accordance with certain embodiments of the present disclosure.

FIG. 2 is a simplified block diagram of a BGP speaker 200 corresponding to BGP speakers 102(1)-(5) of network 100 according to certain embodiments. As shown in FIG. 2, BGP speaker 200 comprises a data (or forwarding) plane 202 including a packet processor 204 and a set of front-panel interfaces (ports) 206. Packet processor 204 is typically an integrated circuit, such as an application-specific integrated circuit (ASIC) or a field-programmable gate array (FPGA), that is responsible for performing line-speed processing of network packets that pass through BGP speaker 200 via interfaces 206. This line-speed processing can include, for example, Layer 3 (L3) routing of IP traffic.

BGP speaker 200 also comprises a management/control plane 208 including a central processing unit (CPU) 210, a main memory 212, and a non-volatile (e.g., flash) storage 214.

CPU 210 is a general-purpose processor that is responsible for managing the configuration/operation of BGP speaker 200 and controlling the device's understanding of the network in which it resides. CPU 210 carries out these functions under the direction of an operating system (OS) 216 that runs on CPU 210 from main memory 212.

Because BGP speaker 200 is a BGP-enabled network device, OS 216 includes a BGP control plane component (hereinafter simply BGP control plane) 218 that allows BGP speaker 200 to participate in the BGP protocol. This process generally involves receiving, by BGP control plane 218, route advertisements from BGP speaker 200's peers, where a route advertisement includes information about a destination device/network (identified by an IP prefix) and a path to that destination device/network, and storing this information in a routing information base (RIB) 220. For each IP prefix in RIB 220, BGP control plane 218 carries out a path selection procedure to identify the best (or in other words, primary) path to that IP prefix from among all possible paths in the RIB and installs the selected best path in a forwarding information base (FIB) 222 maintained in data plane 202 (for use by packet processor 204 to perform packet forwarding). BGP control plane 218 then advertises the contents of RIB 220 to BGP speaker 200's peers so that they can update their own RIBs and select best paths accordingly.

2. BGP PIC and Fate Shared Paths

As noted in the Background section, BGP PIC is a BGP control plane mechanism that reduces the convergence time of BGP after a network failure (e.g., a link or node failure). Traditionally, when such a failure occurs, each BGP speaker in the network needs to withdraw the paths affected by the failure and recompute new best paths. This process, known as convergence, can take a significant amount of time, during which the BGP speaker may drop traffic (because it is still using the failed paths). To mitigate this problem, BGP PIC enables a BGP speaker like BGP speaker 200 of FIG. 2 to precompute one or more backup paths (in addition to a best path) for each IP prefix in its RIB and install the precomputed backup paths in its FIB, along with the best paths. If a failure on the best path for a particular IP prefix occurs, the BGP speaker's data plane can immediately failover to using one of the precomputed backup paths for traffic destined for that IP prefix, thereby reducing its convergence time and minimizing traffic loss/disruption.

In some network topologies, there may be groups of paths that are vulnerable to a common failure which can bring down (or in other words, render inoperable) all paths in the same group. These groups are referred to herein as fate shared groups and the paths in a fate shared group are referred to herein as fate shared paths. One example of a fate shared group is a group of paths that pass through network nodes residing in the same geographic region, such as the paths between BGP speaker 102(1) and BGP speakers 102(2) and 102(3) of FIG. 1 (and similarly between BGP speaker 102(1) and BGP speakers 102(4) and 102(5)), because a failure that affects the entirety of the region (such, e.g., a power failure) can take all of those network nodes offline. Another example of a fate shared group is a group of paths that are connected to egress or ingress interfaces on the same data plane module (e.g., line card) of a BGP speaker, because a failure of that data plane module can cause all of the interfaces to fail. Yet another example of a fate shared group is a group of paths with links that are carried over a common physical transmission medium, such as a single fiber connection, because a failure of that physical transmission medium can cause all of the links to become inoperable.

Fate shared groups/paths are problematic in the context of BGP PIC because BGP PIC may select backup paths for an IP prefix that are in the same fate shared group as the IP prefix's best path. In this scenario, it is possible or likely that both the best path and the backup paths will go down simultaneously (due to being susceptible to a common failure). Such an outcome would trigger the full BGP convergence process, thereby rendering the BGP PIC mechanism ineffective for its intended purpose of reducing convergence time.

3. Solution Overview

Figure 3:
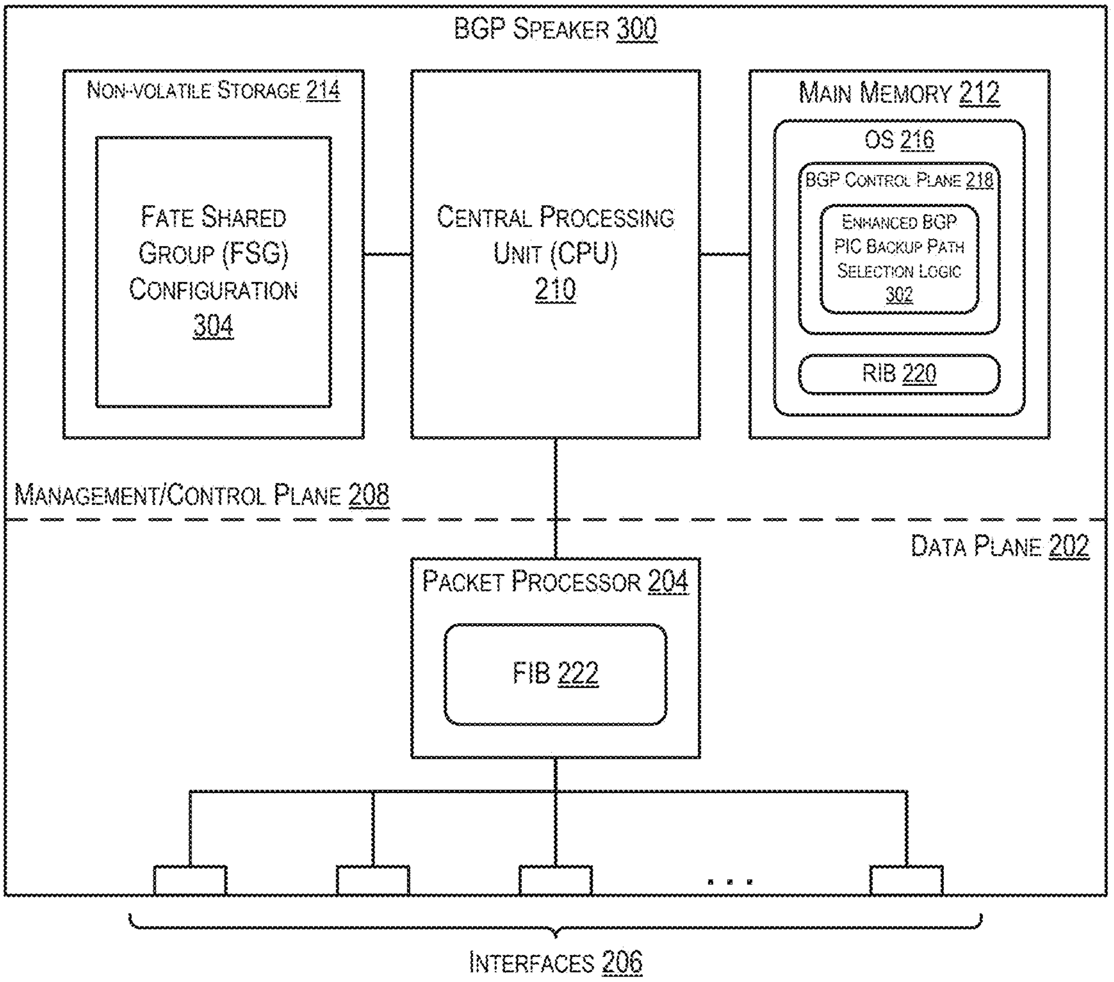

To address the foregoing and other similar or related problems, FIG. 3 depicts a modified version 300 of BGP speaker 200 of FIG. 2 according to certain embodiments. As shown, BGP speaker 300 includes an enhanced BGP PIC backup path selection logic component (hereinafter simply enhanced backup path selection logic) 302 within BGP control plane 218. Enhanced backup path selection logic 302 may be embodied in program code that is executable by a processor of BGP speaker 300, such as by CPU 210. BGP speaker 300 also includes a fate shared group (FSG) configuration 304 that is maintained on non-volatile storage 214.

At a high level, enhanced backup path selection logic 302 enables BGP speaker 300 (and more precisely, its BGP control plane 218) to select one or more backup paths for each IP prefix in RIB 220 in a manner that excludes, to the extent possible, paths which are fate shared with the IP prefix's best path. Stated another way, logic 302 enables BGP speaker 300 to select best and backup paths for each IP prefix that are not in the same FSG (and thus not vulnerable to the same failure) on a best effort basis. This selection process is driven by FSG configuration 304, which includes information for determining what (if any) FSG a given path belongs to. By avoiding the selection of backup paths for an IP prefix that are fate shared with the IP prefix's best path, enhanced backup path selection logic 302 significantly reduces the likelihood that the backup paths will fail at the same time as the best path and consequently improves the effectiveness of the BGP PIC mechanism.

For example, with respect to network 100 of FIG. 1, assume BGP speaker 102(1) implements enhanced backup path selection logic 302/FSG configuration 304 and its FSG configuration indicates that, for a given IP prefix X, the paths to X through BGP speakers 102(2) and 102(3) are members of a first fate shared group called FSG-1 and the paths to X through BGP speakers 102(4) and 102(5) are members of a second fate shared group called FSG-2. Further assume that BGP speaker 102(1)'s BGP control plane selects the path through BGP speaker 102(2) as the best path to IP prefix X. In this scenario, in accordance with its enhanced backup path selection logic, BGP speaker 102(1) will not select the path through BGP speaker 102(3) as a backup path for the best path because those two paths are fate shared. Instead, BGP speaker 102(1) will select the paths through BGP speakers 102(4) and 102(5), which are part of a completely different FSG, as backup paths for the best path.

In one set of embodiments, the FSG information held in FSG configuration 304 can be locally defined/configured on BGP speaker 300 by, e.g., a device user or administrator. The approach is useful in cases where the peers of BGP speaker 300 are connected to its front panel interfaces via direct links, because in such cases BGP speaker 300 can correlate those peers with the paths in RIB 220 via the paths' next hops and thus the user/administrator of BGP speaker 300 can define the FSGs on a per-peer basis. For example, returning to network 100 of FIG. 1, the administrator of BGP speaker 102(1) can dictate that all paths that have a next hop of BGP speaker 102(2) or 102(3) should be placed in a first FSG (due to passing through common geographic region 104(1)) and similarly all paths that have a next hop of BGP speaker 102(4) or 102(5) should be placed in a second FSG (due to passing through common geographic region 104(2)).

Figure 4:
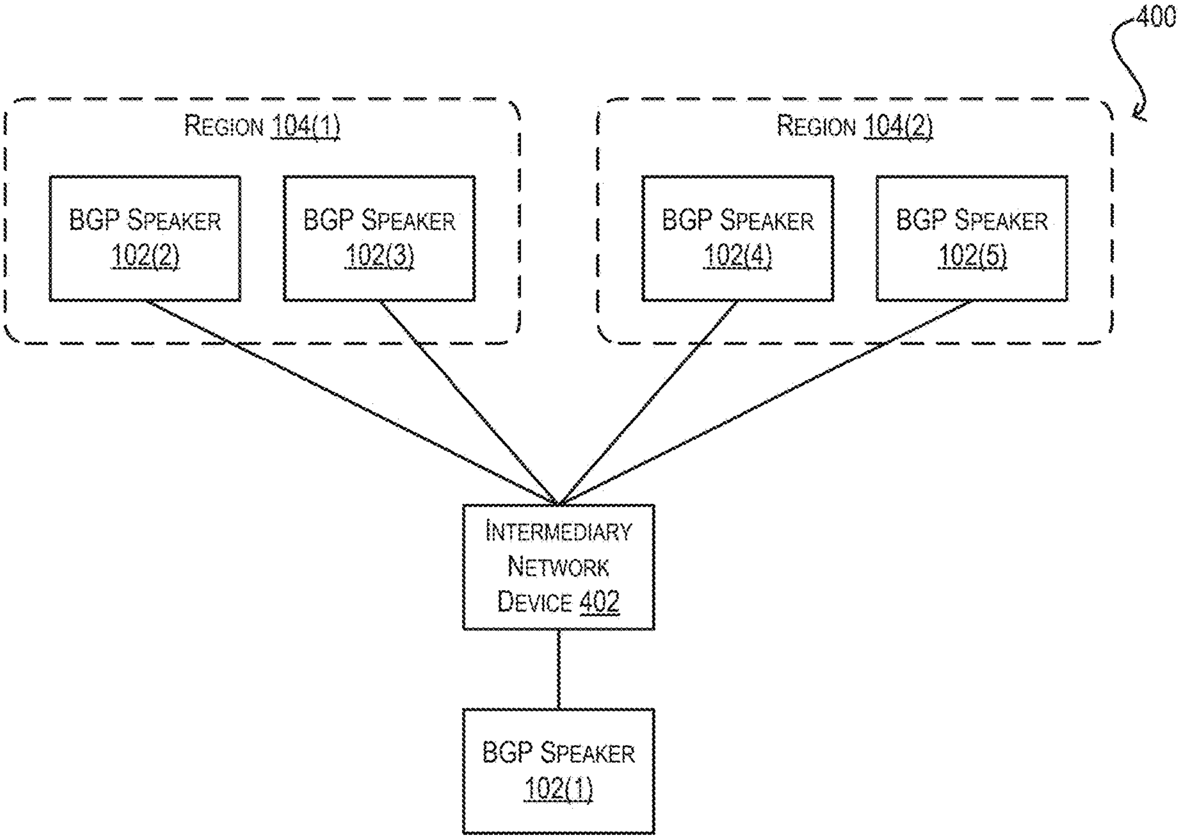
FIG. 4 depicts a second example BGP speaker in accordance with certain embodiments of the present disclosure.

In another set of embodiments, the FSG information held in FSG configuration 304 can be defined/configured remotely and can be communicated to BGP speaker 300 via a routing attribute (such as, but not limited to, the BGP community attribute) that is attached to paths advertised by BGP speaker 300's peers. This approach is useful in scenarios where the peers are in a better position to know how the FSGs should be defined. For instance, FIG. 4 depicts a network 400 that is similar to network 100 of FIG. 1 but includes an intermediary network device 402 between BGP speaker 102(1) and BGP speakers 102(2)-(5). In this network, BGP speaker 102(1) exchanges BGP reachability information with peers 102(2)-(5) via multi-hop tunnels (e.g., Virtual Extensible Local Area Network (VXLAN) or Generic Routing Encapsulation (GRE) tunnels) through intermediary network device 402 rather than via direct links, and thus BGP speaker 102(1) may not be able to correlate the paths in its RIB with peers 102(2)-(5). Accordingly, each peer 102(2)-(5) can instead inform BGP speaker 102(1) of the FSGs for the paths advertised by that peer.

The remaining sections of this disclosure describe workflows for populating FSG configuration 304 using the first and second approaches above, as well as for selecting backup paths using enhanced backup path selection logic 302. It should be appreciated that FIGS. 1-4 and the foregoing high-level solution description are illustrative and not intended to limit embodiments of the present disclosure. For example, although FIG. 3 depicts a particular arrangement of components in BGP speaker 300, other arrangements are possible (e.g., the functionality attributed to a particular component may be split into multiple components, components may be combined, etc.). One of ordinary skill in the art will recognize other similar modifications, variations, and alternatives.

4. Populating the FSG Configuration

Figure 5:
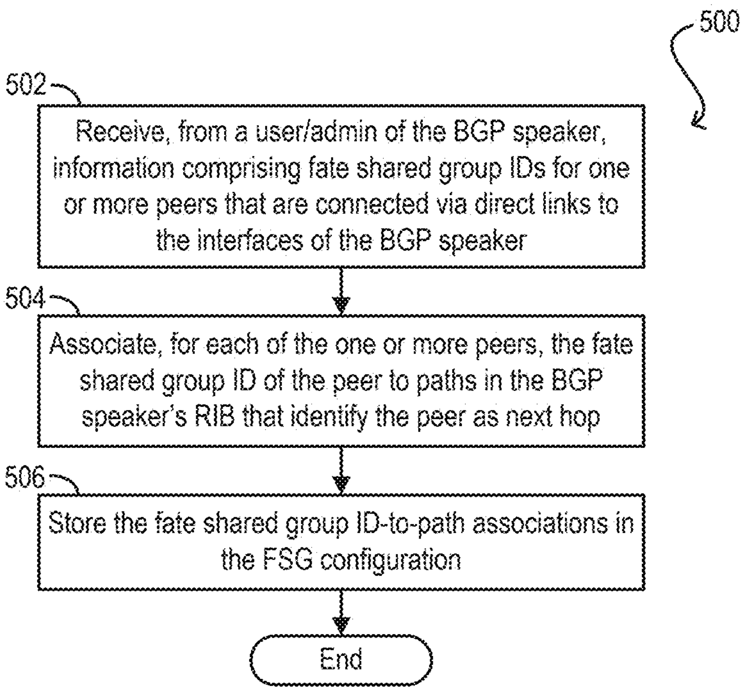
FIG. 5 depicts a first workflow for populating fate shared group configuration in accordance with certain embodiments of the present disclosure.
Figure 6:
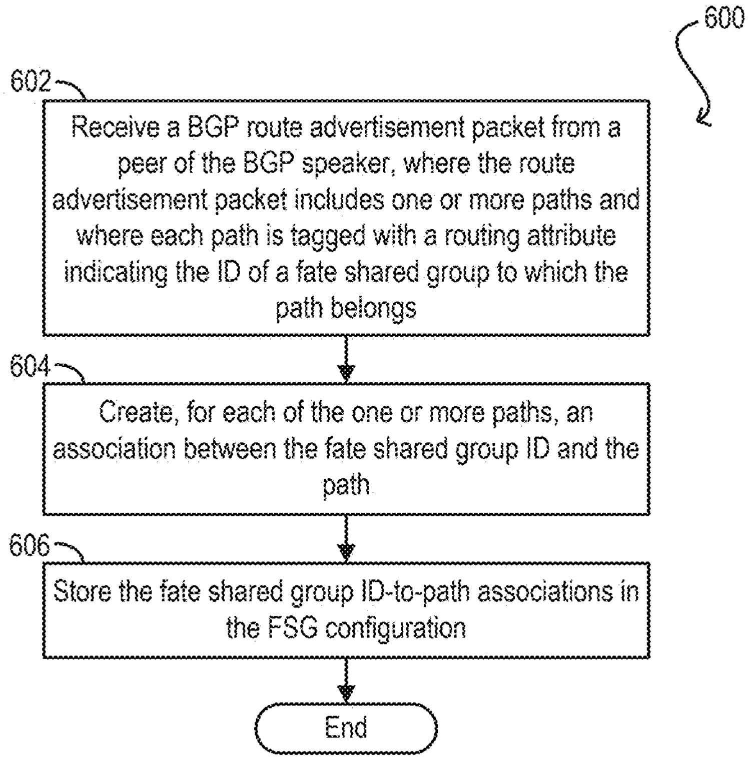
FIG. 6 depicts a second workflow for populating fate shared group configuration in accordance with certain embodiments of the present disclosure.

FIGS. 5 and 6 depict workflows 500 and 600 respectively that may be executed by BGP control plane 218 of BGP speaker 300 for populating FSG configuration 304 according to certain embodiments. In particular, workflow 500 presents a process for populating FSG configuration 304 with FSG information provided locally by a user or administrator of BGP speaker 300 and workflow 600 presents a process for populating FSG configuration 304 with FSG information received from peers via a routing attribute.

Starting with step 502 of workflow 500, BGP control plane 218 can receive, from a user/administrator of BGP speaker 300, information comprising FSG identifiers (IDs) for one or more peers of BGP speaker 300 that are connected via direct links to interfaces 206 of speaker 300. The FSG ID for a given peer identifies a FSG to which that peer belongs.

At step 504, BGP control plane 218 can associate, for each of the one or more peers, the FSG ID of the peer to paths in RIB 220 that identify that peer as the next hop. BGP control plane 218 can then store the FSG ID-to-path associations in FSG configuration 304. For example, if a path P1 has peer A as its next hop and peer A is a member of FSG G1, path P1 will be associated with FSG G1 in FSG configuration 304.

Turning now to workflow 600, at step 602, BGP control plane 218 can receive a BGP route advertisement packet from a peer of BGP speaker 300, where the route advertisement packet includes one or more paths and where each path is tagged with a routing attribute indicating the ID of a FSG to which the path belongs. In one set of embodiments, the routing attribute may be the BGP community attribute.

BGP control plane 218 can then create, for each of the one or more paths, an association between the FSG ID and the path (step 604) and can store the FSG ID-to-path associations in FSG configuration 304 (step 606). For example, if the route advertisement packet includes a path P1 that is tagged with a BGP community attribute G1, path P1 will be associated with FSG G1 in FSG configuration 304.

5. Selecting Backup Paths

Figure 7:
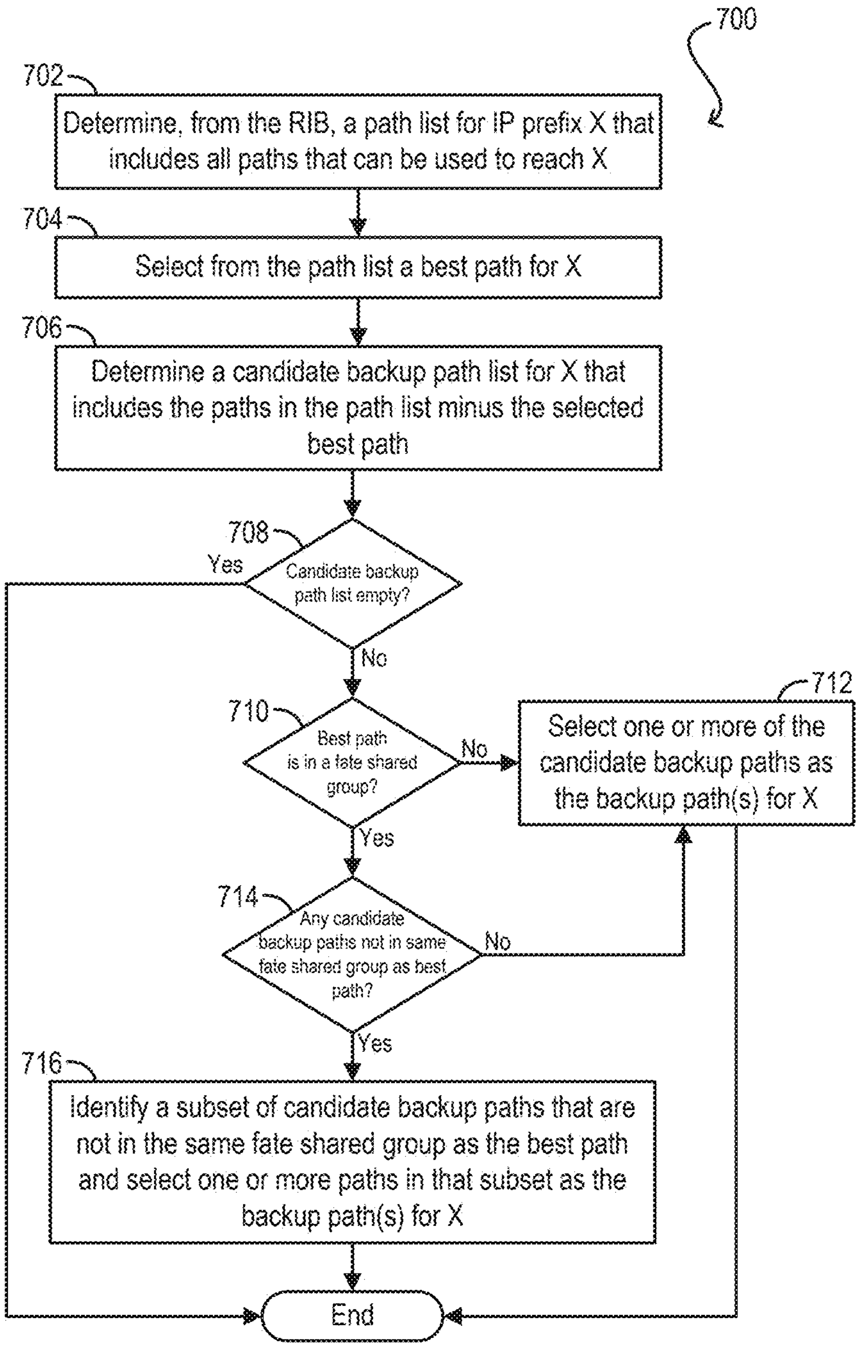
FIG. 7 depicts a workflow for selecting backup paths in accordance with certain embodiments of the present disclosure.

FIG. 7 depicts a workflow 700 that may be performed by BGP control plane 218 of BGP speaker 300 using enhanced backup path selection logic 302 for selecting a best path and one or more backup paths for an IP prefix X according to certain embodiments.

Starting with step 702, BGP control plane 218 can determine from RIB 220 a path list for IP prefix X that includes all of the paths that BGP speaker 300 can use to reach X.

At step 704, BGP control plane 218 can select from the path list a best path for IP prefix X (using existing BGP path selection logic). This best path is a preferred network route for reaching (or in other words, sending traffic to) a destination device or network that is identified by IP prefix X.

At step 706, BGP control plane 218 can determine a candidate backup path list for IP prefix X that includes the paths in the path list minus the selected best path. BGP control plane 218 can then check whether the candidate backup path list is empty (step 708). If the answer is yes, BGP control plane 218 can conclude that there are no available backup paths for the best path and workflow 700 can end.

If the answer at step 708 is no (i.e., the candidate backup path list is not empty), BGP control plane 218 can further check whether the best path is in a FSG (step 710). BGP control plane 218 can perform this check by determining whether the best path is associated with a FSG ID in FSG configuration 304. If the answer at step 710 is no, BGP control plane 218 can conclude that all of the candidate backup paths in the candidate backup path list are valid and can select one or more of those paths as the backup path(s) for IP prefix X (step 712).

If the answer at step 710 is yes (i.e., the best path is in a FSG per FSG configuration 304), BGP control plane 218 can further check whether there are any candidate backup paths in the candidate backup path list that are not in the same FSG as the best path (step 714). BGP control plane can perform this check by determining whether there are any candidate backup paths that are associated with a FSG ID in FSG configuration 304 that is different from the FSG ID of the best path, or are associated with no FSG ID at all.

If the answer at step 714 is yes (i.e., there is at least one candidate backup path that is not in the same FSG as the best path), BGP control plane 218 can identify the subset of candidate backup paths that are not in the same FSG as the best path and can select one or more paths in that specific subset as the backup path(s) for IP prefix X (step 716). In this way, BGP control plane 218 can avoid selecting backup paths that are vulnerable to a common failure as the best path.

Finally, if the answer at step 714 is no (i.e., all of the candidate backup paths are in the same FSG as the best path), BGP control plane 218 can once again conclude that all of the candidate backup paths in the candidate backup path list are valid and can select one or more of those paths as the backup path(s) for IP prefix X (step 712). This means that BGP control plane 218 only excludes fate shared paths from consideration as backup paths on a best effort basis; if the sole backup path options are paths that are fate shared with the best path, then those paths are not excluded.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network device that implements Border Gateway Protocol (BGP), the method comprising:

selecting a best path for an Internet Protocol (IP) prefix, the best path being a preferred network route for reaching a destination device or network identified by the IP prefix;

determining whether the best path is in a fate shared group comprising a group of paths that are vulnerable to a common failure;

upon determining that the best path is in a fate shared group having the vulnerability to the common failure, determining whether any candidate backup paths in a list of candidate backup paths for the IP prefix are in the fate shared group of the best path having the vulnerability to the common failure, such that the common failure renders inoperable each of the candidate backup paths in the list of candidate backup paths that are in the fate shared group of the best path; and excluding at least one of the candidate backup paths in the fate shared group of the best path from the IP prefix.

2. The method of claim 1 further comprising, upon determining that the best path is not in a fate shared group:

selecting one or more candidate backup paths in the list as backup paths for the IP prefix.

3. The method of claim 1 further comprising, upon determining that all candidate backup paths in the list of candidate backup paths are in the fate shared group:

selecting one or more candidate backup paths in the list as backup paths for the IP prefix.

4. The method of claim 1 wherein determining whether the best path is in a fate shared group comprises:

determining whether the best path is associated with a fate shared group identifier in a fate shared group configuration maintained on the network device.

5. The method of claim 1 wherein determining whether any candidate backup paths in a list of candidate backup paths for the IP prefix are in the fate shared group comprises:

determining whether any candidate backup paths in the list are associated with a same fate shared group identifier as the best path in a fate shared group configuration maintained on the network device.

6. The method of claim 1 wherein the fate shared group is locally configured on the network device.

7. The method of claim 1 wherein the fate shared group is defined based on information received via one or more route advertisement packets sent by one or more BGP peers of the network device.

8. The method of claim 7 wherein each of the one or more route advertisement packets includes a path and a routing attribute for the path that identifies the fate shared group.

9. The method of claim 8 wherein the routing attribute is a BGP community attribute.

10. A network device that implements Border Gateway Protocol (BGP), the network device comprising:

a central processing unit (CPU);

a non-volatile storage; and a main memory having stored thereon program code that, when executed by the CPU, causes the CPU to:

select a best path for an Internet Protocol (IP) prefix, the best path being a preferred network route for reaching a destination device or network identified by the IP prefix;

determine whether the best path is in a fate shared group comprising a group of paths that are vulnerable to a common failure;

upon determining that the best path is in a fate shared group having the vulnerability to common failure, determine whether any candidate backup paths in a list of candidate backup paths for the IP prefix are in the fate shared group of the best path having the vulnerability to the common failure, such that the common failure renders inoperable each of the candidate backup paths in the list of candidate backup paths that are in the fate shared group of the best path; and exclude at least one of the candidate backup paths in the fate shared group of the best path from the IP prefix.

11. The network device of claim 10 wherein the program code further causes the CPU to, upon determining that the best path is not in a fate shared group:

select one or more candidate backup paths in the list as backup paths for the IP prefix.

12. The network device of claim 10 wherein the program code further causes the CPU to, upon determining that all candidate backup paths in the list of candidate backup paths are in the fate shared group:

select one or more candidate backup paths in the list as backup paths for the IP prefix.

13. The network device of claim 10 wherein the program code that causes the CPU to determine whether the best path is in a fate shared group comprises program code that causes the CPU to:

determine whether the best path is associated with a fate shared group identifier in a fate shared group configuration maintained on the network device.

14. The network device of claim 10 wherein the program code that causes the CPU to determine whether any candidate backup paths in a list of candidate backup paths for the IP prefix are in the fate shared group comprises program code that causes the CPU to:

determine whether any candidate backup paths in the list are associated with a same fate shared group identifier as the best path in a fate shared group configuration maintained on the network device.

15. The network device of claim 10 wherein the fate shared group is locally configured on the network device.

16. The network device of claim 10 wherein the fate shared group is defined based on information received via one or more route advertisement packets sent by one or more BGP peers of the network device.

17. The network device of claim 16 wherein each of the one or more route advertisement packets includes a path and a routing attribute for the path that identifies the fate shared group.

18. The network device of claim 17 wherein the routing attribute is a BGP community attribute.

19. A method performed by a network device that implements Border Gateway Protocol (BGP), the method comprising:

selecting a best path for an Internet Protocol (IP) prefix, the best path being a preferred network route for reaching a destination device or network identified by the IP prefix;

determining that the best path is in a first fate shared group comprising a group of paths that are vulnerable to a common failure;

determining whether any candidate backup paths in a list of candidate backup paths for the IP prefix are in the first fate shared group having the vulnerability to the common failure, such that the common failure renders inoperable each of the candidate backup paths in the list of candidate backup paths that are in the first fate shared group with the best path;

excluding at least one of the candidate backup paths in the first fate shared group from the IP prefix;

determining one or more candidate backup paths that are in a second fate shared group different from the first fate shared group, or are not in any fate shared group; and selecting at least one of the one or more candidate backup paths as a backup path for the IP prefix.

20. The method of claim 19 wherein the first and second fate shared groups are locally configured on the network device or are defined based on information received via one or more route advertisement packets.

* * * * *